J. H. GILMAN.
ELEVATOR FOR CORN, &c.
APPLICATION FILED JUNE 30, 1919.
Reissued Aug. 12, 1919.
14,705.
2 SHEETS—SHEET 1.
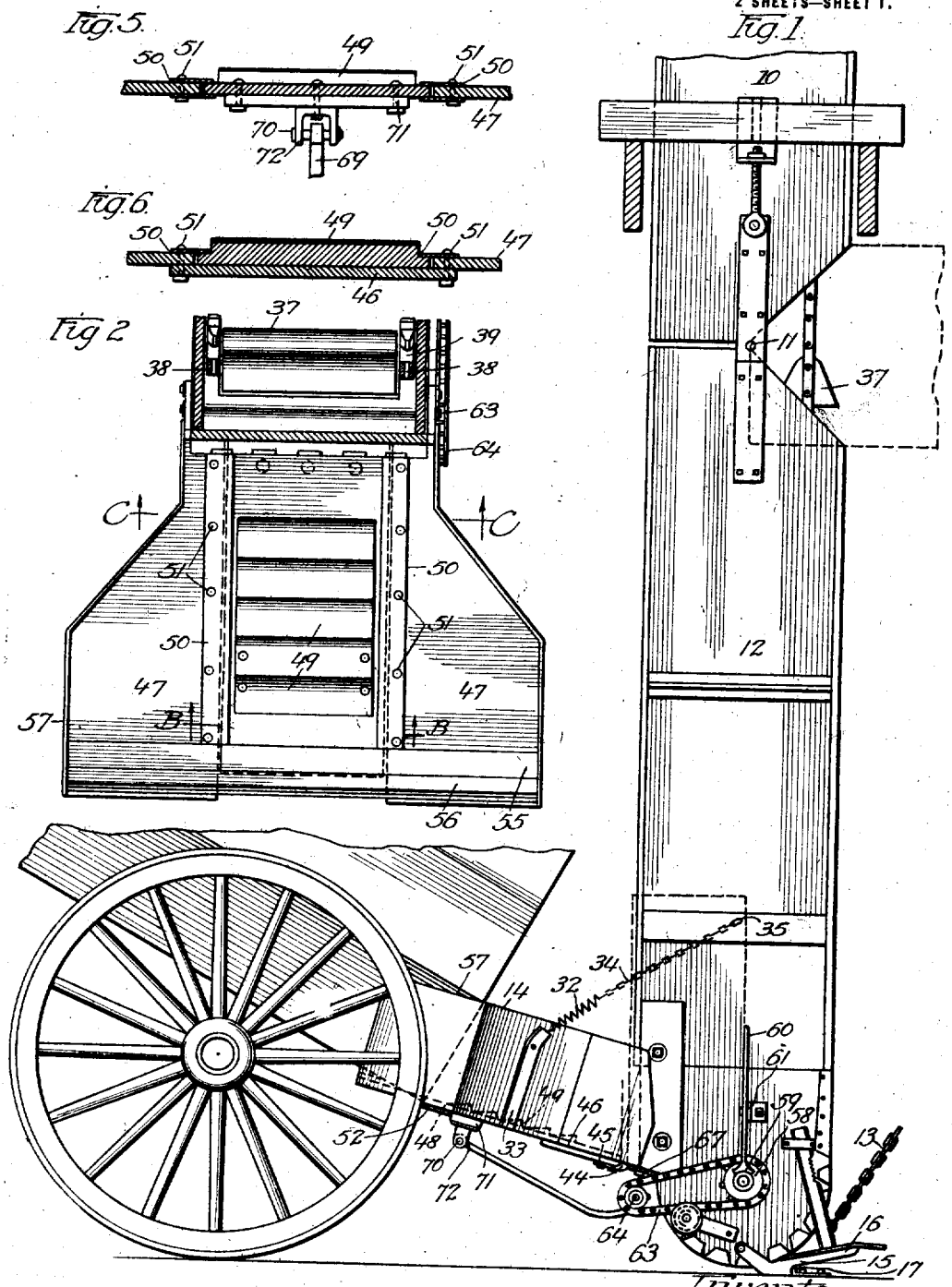
Inventor:
John H. Gilman,
by John Howard McElroy
his Atty.
THE COLUMBIA PLANOGRAPH CO., WASHINGTON, D. C.

J. H. GILMAN.

ELEVATOR FOR CORN, &c.

APPLICATION FILED JUNE 30, 1919.

Reissued Aug. 12, 1919.

14,705.

2 SHEETS—SHEET 2.

Inventor:
John H. Gilman,
by John Howard McElroy, Atty.

THE COLUMBIA PLANOGRAPH CO., WASHINGTON, D. C.

UNITED STATES PATENT OFFICE.

JOHN H. GILMAN, OF OTTAWA, ILLINOIS, ASSIGNOR TO KING & HAMILTON COMPANY, OF OTTAWA, ILLINOIS, A CORPORATION OF ILLINOIS.

ELEVATOR FOR CORN, &c.

14,705. Specification of Reissued Letters Patent. Reissued Aug. 12, 1919.

Original application filed December 17, 1914, Serial No. 877,646. Patent No. 1,281,342, dated October 15, 1918. Divided and application filed June 29, 1917, Serial No. 177,778. Original No. 1,303,552, dated May 13, 1919. Application for reissue filed June 30, 1919. Serial No. 307,828.

*To all whom it may concern:*

Be it known that I, JOHN H. GILMAN, a citizen of the United States, and a resident of Ottawa, in the county of La Salle and State of Illinois, have invented certain new and useful Improvements in Elevators for Corn, &c., of which the following is a full, clear, and exact specification.

My invention is concerned with elevators of the vertical type which are adapted to be placed in the center of narrow driveways, which necessitate the lower portion being hinged so that it can be swung up out of the way to permit a wagon to pass beneath it to get into dumping position, and which are provided with pivoted hoppers widened at their outer ends to encompass the end of the wagon bed, the contents of which are being elevated, and narrowed at their inner pivoted ends to discharge into the narrower elevator boot, said hoppers being adapted to be folded up parallel to the hinged portion of the elevator-casing while the latter is swung up out of the way, and to be spring-held in contact with the rear end of the under side of the wagon-bed while it is in use, despite the rise and fall of the latter as it is being dumped, or the variation in the height of different wagon-beds above the ground, and is embodied in such an elevator in which the contents of the hopper will be fed steadily to the elevator despite the varying angles assumed by said hopper and the contraction in the capacity thereof of the inner discharge end as compared with the outer receiving end.

The present application is for a reissue of my original Patent No. 1,303,552, dated May 13, 1919, granted upon application filed June 29, 1917, Serial No. 177,778, which was a division of my original application No. 877,646, filed December 17, 1914, and to illustrate my invention, I have annexed hereto two sheets of drawings, in which the same reference characters are used to designate identical parts of all the figures, of which—

Figure 1 is a side elevation of a portion of an elevator having my improvements applied thereto, and showing the rear end of a wagon in dumping position;

Fig. 2 is a top plan view of the hopper and a portion of the elevator;

Figs. 5 and 6 are details in section on the lines B—B and C—C of Fig. 2, but also on an enlarged scale.

Figure 3:
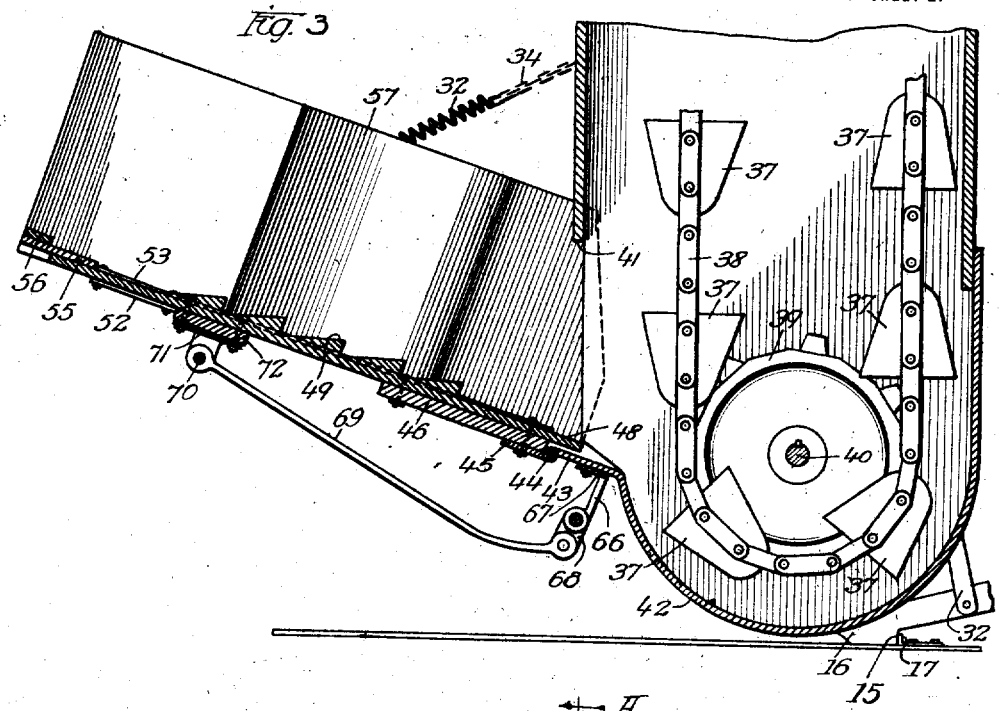
Fig. 3 is a detail on an enlarged scale, as seen in section on the line A—A of Fig. 4.
Figure 4:
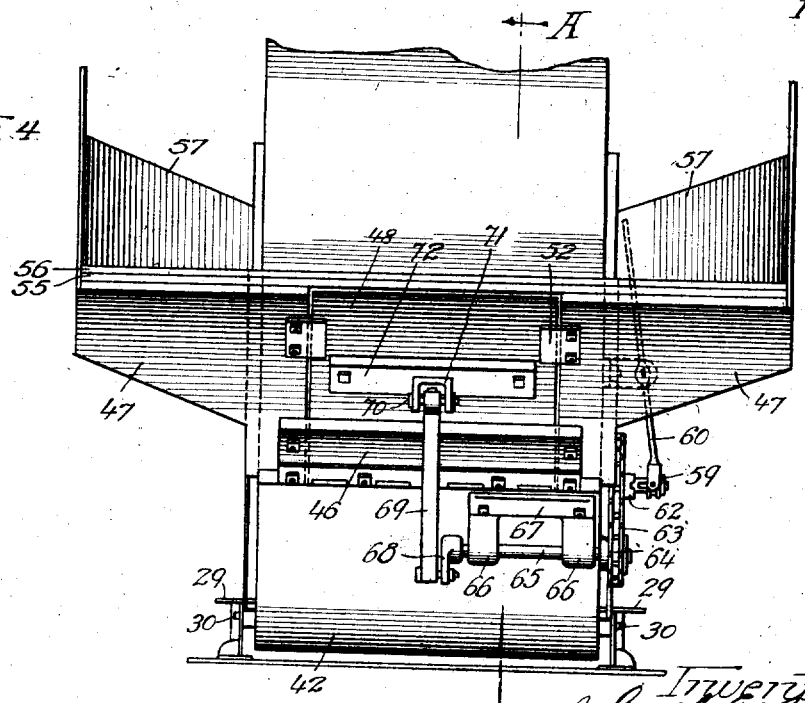
Fig. 4 is a view of the lower end of the elevator and hopper, as seen from the left-hand side of Fig. 1, but also on an enlarged scale.

Elevators of the type herein shown contain a vertical stationary portion 10 of the conveyer trough or framework, to which is pivoted at 11 the lower portion 12 of the same framework, which is adapted to be swung and lifted by the chain 13 secured to the lower end thereof, from the vertical operative position shown in full lines in Fig. 1 to the horizontal inoperative position indicated in dotted lines, to permit a wagon to drive beneath the elevator and into the dumping position shown. When the wagon has been driven into dumping position, the lower section 12 of the framework or trough is swung down from its dotted-line to its full-line position, the hopper 14 having been previously swung down so that it will have its outer end extend beneath the rear end of the wagon-bed as the elevator section swings into place, where it is secured by the coöperation of the shoulders 15 of the locking lever 16, of which there is preferably one on each side, with the locking lugs or projections 17, which are secured to the floor of the driveway. The lower portion 12 of the conveyer frame is preferably counterbalanced by some suitable mechanism, and being thus counterbalanced so that it can be swung up without any difficulty, it becomes advisable to lock said section in its operative position, for which purpose I may employ the previously mentioned locking lever 16, which has any suitable connections for holding the portion 12 against swinging while it is in use.

In these elevators, a series of cups 37 are suspended between the pairs of sprocket chains 38, which chains coöperate with sprocket wheels 39 secured on the shaft 40 journaled in the bottom of the lower section 12. The chains 38 are driven by any suitable power, so that in operation the cups are carried up continuously to lift the grain to the top of the elevator. Suitable spring connections are employed between the swinging portion 12 of the conveyer frame and the hopper 14, such for instance as the helically-coiled contractile springs 32 connected at their lower ends to the bars 33 secured to the sides of the hopper, while their upper ends are secured to the lower ends of the chains 34, the upper ends of which are secured at 35 to the casing 12. The trough or casing 12 has in the lower side thereof, adjacent the hopper 14, the opening 41 formed by omitting a portion of the wall, and the bottom of the casing takes the form of a boot 42, preferably formed of heavy sheet-metal cut and bent into the shape shown. The end 43 of said sheet-metal is utilized to form the fixed member of a hinge 44, the other member 45 of which is bolted to the board 46 forming the support for the lower end of the hopper 14. This board 46 has bolted thereto the two side pieces 47, which are preferably of the shape clearly shown in Fig. 2, and form the bottom of the hopper except so far as the same is formed by the reciprocating feeding member 48. The upper surface of this reciprocating feeding member is provided with the ratchet bars 49, the teeth of which face downwardly, and it is adapted to reciprocate on bearings formed at its lower end by the upper surface of the bar 46 and the opposed plates 50, as seen in Figs. 2 and 3, and held in place by the bolts 51, while the bearings at the upper end are formed by the opposed plates 52 and 50 secured at the top and bottom of edges of the piece 47 by the bolts 51. The bottom of the hopper is strengthened at the outer end by the cross pieces 55 and 56 extending across said end and suitably secured to the pieces 47. The sides 57 of the hopper, which converge as seen in Fig. 2, may be formed of sheet-metal, or in any manner desired, and they are designed to hold the corn on the bottom of the hopper and direct it into the boot 42.

To reciprocate the feeding member 48, I mount loosely on the outer end of the shaft 40, which is rotated by the conveying mechanism, the sprocket wheel 58, and I spline on the outer end of this shaft 40 the clutch sleeve 59, which is moved by the clutch lever 60, fulcrumed to the wall of the lower section at 61, into and out of engagement with the clutch member 62 formed on the hub of the sprocket wheel 58. A sprocket chain 63 connects this sprocket wheel 58 with a sprocket wheel 64 secured on the outer end of the shaft 65 journaled in bearings 66 formed on the bracket 67 secured to the under side of the portion 43 of the boot. A crank arm 68 carries a crank pin which is connected by the pitman rod 69 with the pivot bolt 70 mounted in the bearing bracket 71 secured to the bar 72 bolted to the under side of the reciprocating feeding member 48. With the construction thus described, it will be readily apparent that when the clutch lever 60 is shifted to throw the reciprocating feeding mechanism into operation, the latter will be reciprocated and the teeth 49 will force the corn down into the boot so that it will be positively forced into the cups 37 to be carried up thereby to the top of the elevator.

When the elevator is not in use, the hopper 14 is swung up and secured with its bottom against the adjacent side of the elevator casing, as indicated in dotted lines in Fig. 1, and the pivoted section 12 of the casing is then swung up to its horizontal position, in which the wagon, the contents of which are to be elevated, can be driven beneath it. When the wagon is in place, the pivoted section 12 is swung down, with the hopper 14 opened out so that its end passes beneath the rear end of the wagon-bed, with the widely separated ends of its sides coöperating with the sides of the end of the wagon-bed against the bottom of which the hopper is held by the action of the springs 32. With the elevator running, the free end of the wagon bed is gradually lifted by any of the well-known wagon-dumps, lowering the rear end slightly and further depressing the hopper 14, which engages the under side of said rear end. As the wagon-bed is tilted more and more, with the bottom endgate removed, the corn flows in a stream, which is apt to be very unsteady, into the hopper 14, and if it is ear corn, the hopper, without the reciprocating feed mechanism shown, unless inclined more than is practicable without digging a pit to receive the boot 42, is sure to clog up, owing to the necessary contraction of the passage way resulting from the narrowing of the hopper from the width of the wagon-bed to that of the elevator-casing. The reciprocation of the serrated bottom portion 48 through this narrowed throat serves to break up the jam, and keeps the device feeding steadily and satisfactorily without any attention from the driver until the contents of the wagon are completely discharged and elevated.

While I have shown and described my invention as embodied in the form which I at present consider best adapted to carry out its purposes, it will be understood that it is capable of some modification, and that I do not desire to be limited in the interpretation of the following claims except as may be necessitated by the state of the prior art.

What I claim as new, and desire to secure by Letters Patent of the United States, is:

1. In an elevator for corn, etc., the combination with a narrow elevator-casing, of an endless conveyer running therein, a hopper open at its top and two ends, having its outer end wider than the casing so as to span and embrace the rear end of a wagon-bed being dumped, and its inner end narrowed to substantially the width of the conveyer pivoted to the casing so as to be folded with its bottom parallel to and in contact with the elevator-casing or extended substantially horizontally therefrom at varying angles to receive the corn poured into its outer end from the wagon-bed being dumped, and having a rectangular bottom portion extending from the outer to the inner end of the hopper, having teeth extended across its upper face and adapted to be reciprocated between the stationary converging sides, spring connections between the sides of the elevator-casing and the hopper to hold the latter in contact with the bottom of the end of the wagon-bed, and means for driving the conveyer and reciprocating the bottom portion of the hopper, for the purpose described.

2. In an elevator for corn, etc., the combination with a narrow elevator-casing, of an endless conveyer running therein, a hopper open at its top and two ends, having its outer end wider than the casing so as to span and embrace the rear end of a wagon-bed being dumped, and its inner end narrowed to substantially the width of the conveyer pivoted to the casing so as to be folded with its bottom parallel to and in contact with the elevator-casing or extended substantially horizontally therefrom at varying angles to receive the corn poured into its outer end from the wagon-bed being dumped, the sides of the hopper consisting of the outer widely separated parallel portions coöperating with the sides of the end of the wagon-bed, the inner, closer parallel portions coöperating with the sides of the elevator-casing, and the converging portions connecting said outer and inner parallel portions, said hopper having a rectangular bottom portion extending from the outer to the inner end of the hopper, having teeth extended across its upper face and adapted to be reciprocated between the stationary converging sides, spring connections between the sides of the elevator-casing and the hopper to hold the latter in contact with the bottom of the end of the wagon-bed, and means for driving the conveyer and reciprocating the bottom portion of the hopper, for the purpose described.

In witness whereof I have hereunto set my hand this 26th day of June, A. D. 1919.

JOHN H. GILMAN.

Copies of this patent may be obtained for five cents each, by addressing the "Commissioner of Patents, Washington, D. C."